May 11, 1937.  E. G. ROEHM ET AL  2,079,717
MACHINE FOR MILLING TURBINE BLADES
Filed Jan. 22, 1935  11 Sheets-Sheet 1
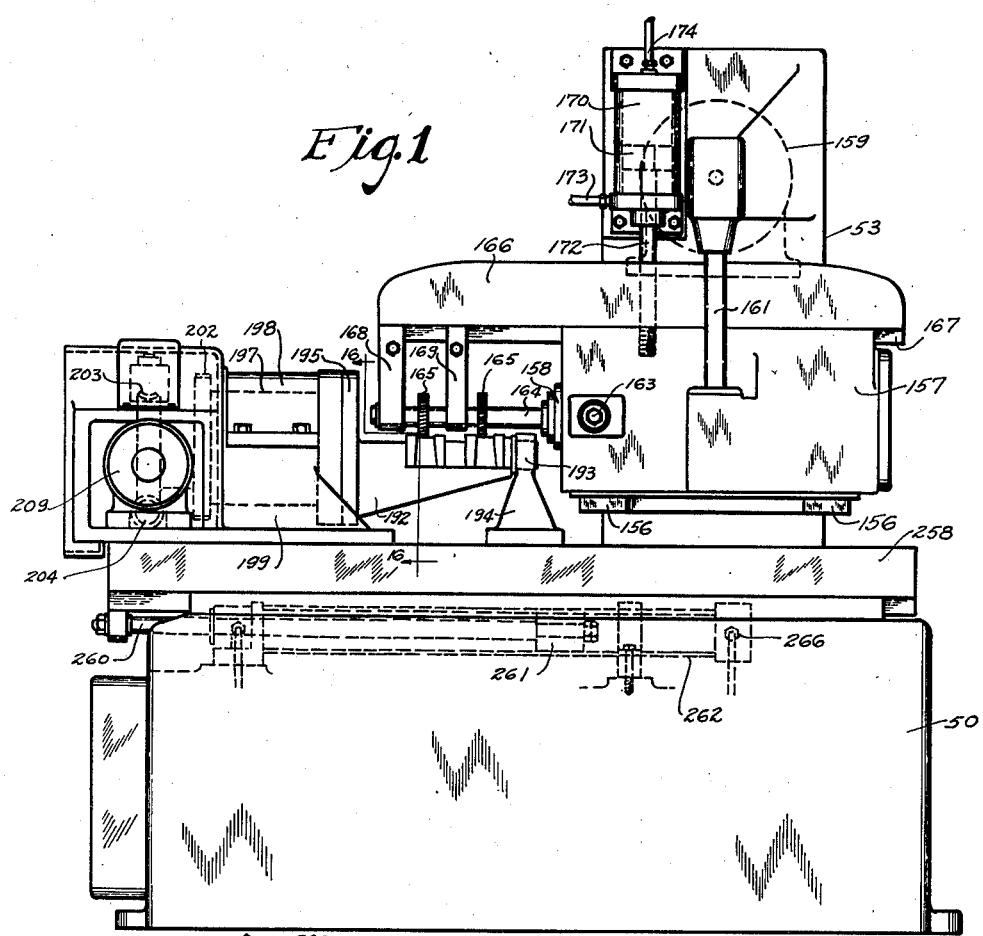
Fig.1
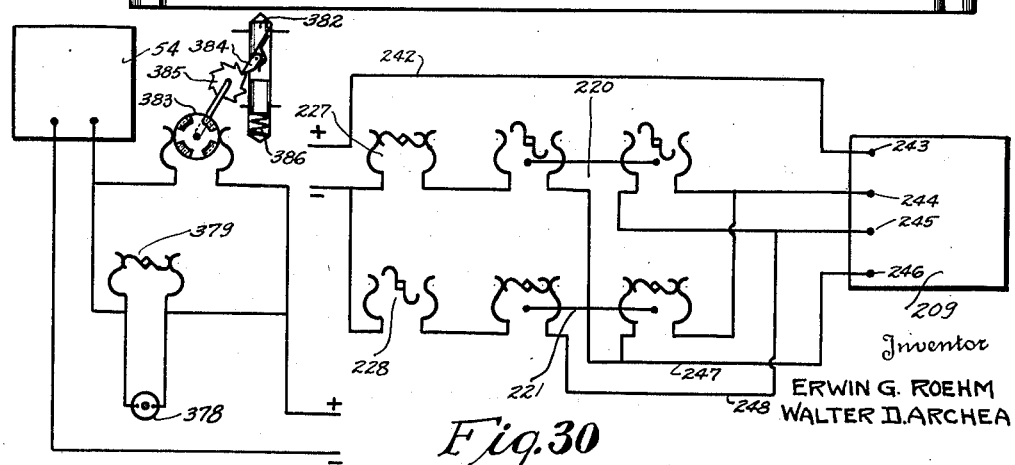
Fig.30
Fig.31
Inventor
ERWIN G. ROEHM
WALTER D. ARCHEA
By AHK Parsons
Attorney Inventor
ERWIN G. ROEHM
WALTER D. ARCHEA

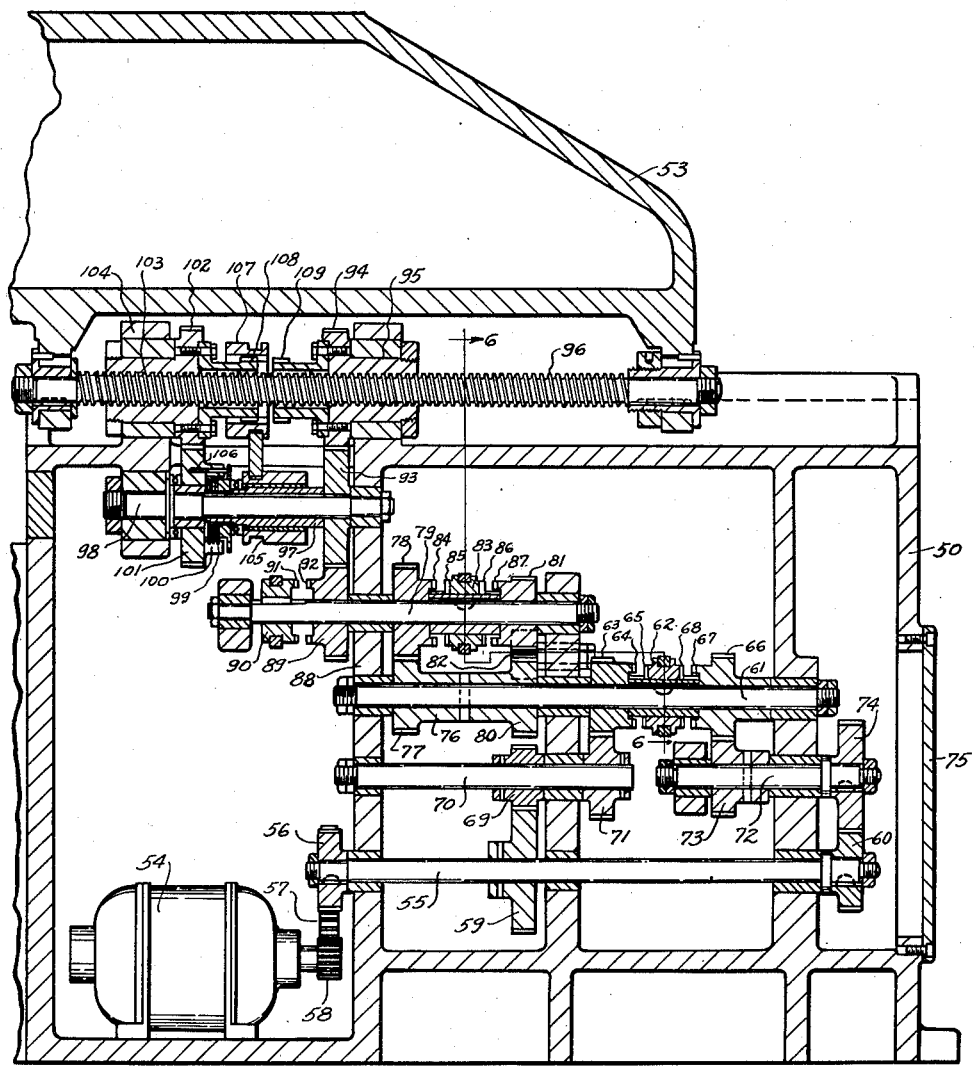

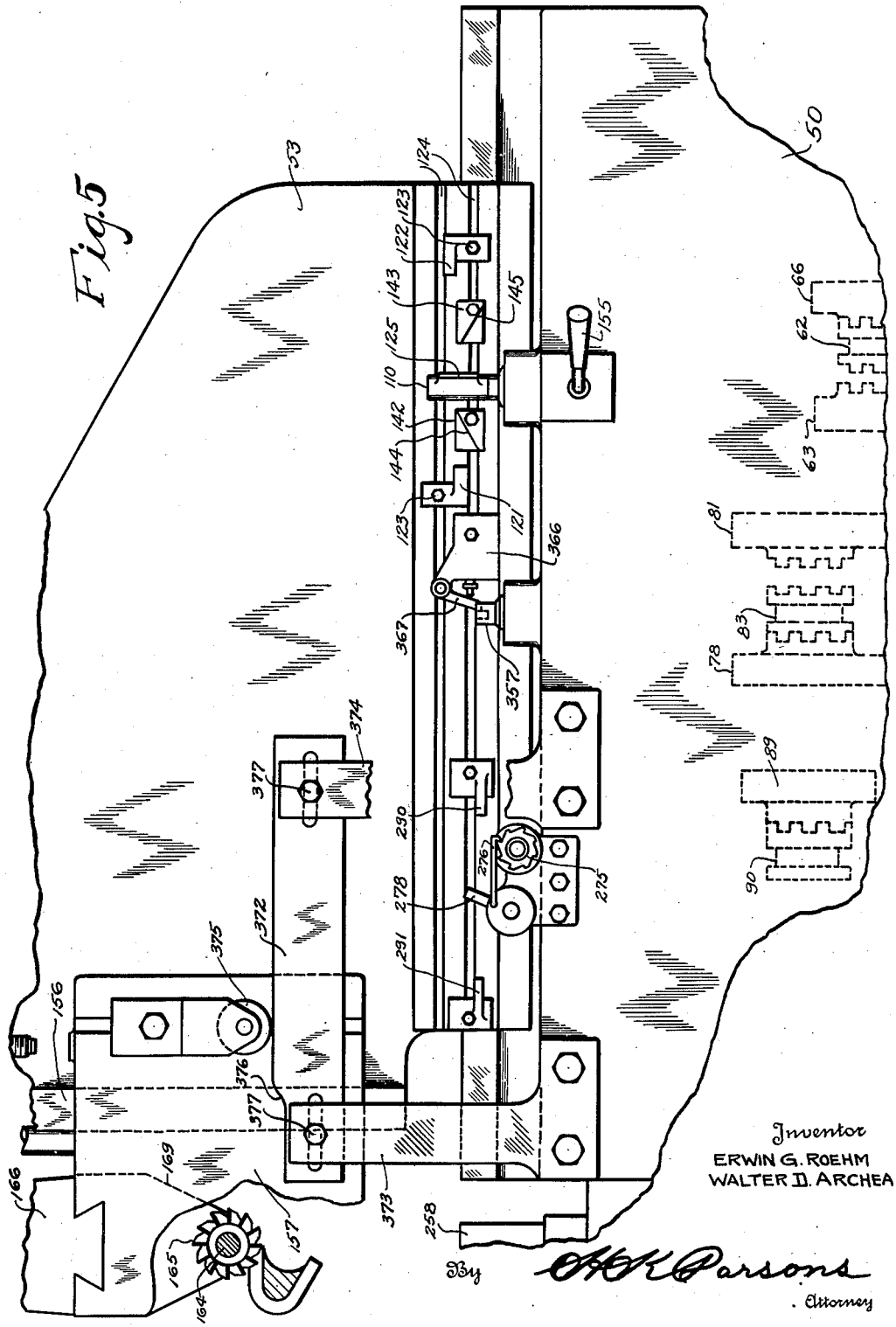

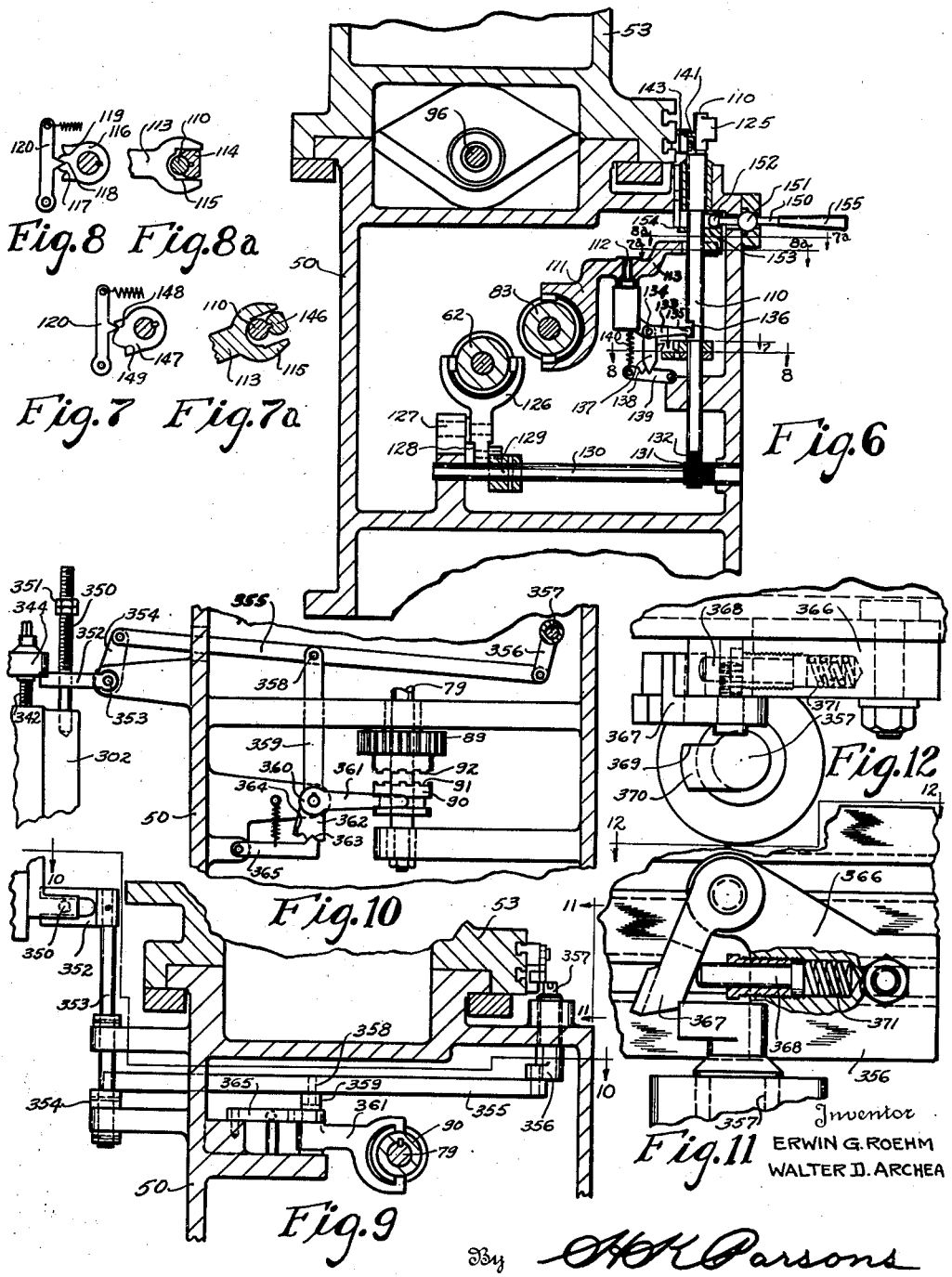

May 11, 1937.　　E. G. ROEHM ET AL　　2,079,717
MACHINE FOR MILLING TURBINE BLADES
Filed Jan. 22, 1935　　11 Sheets-Sheet 7
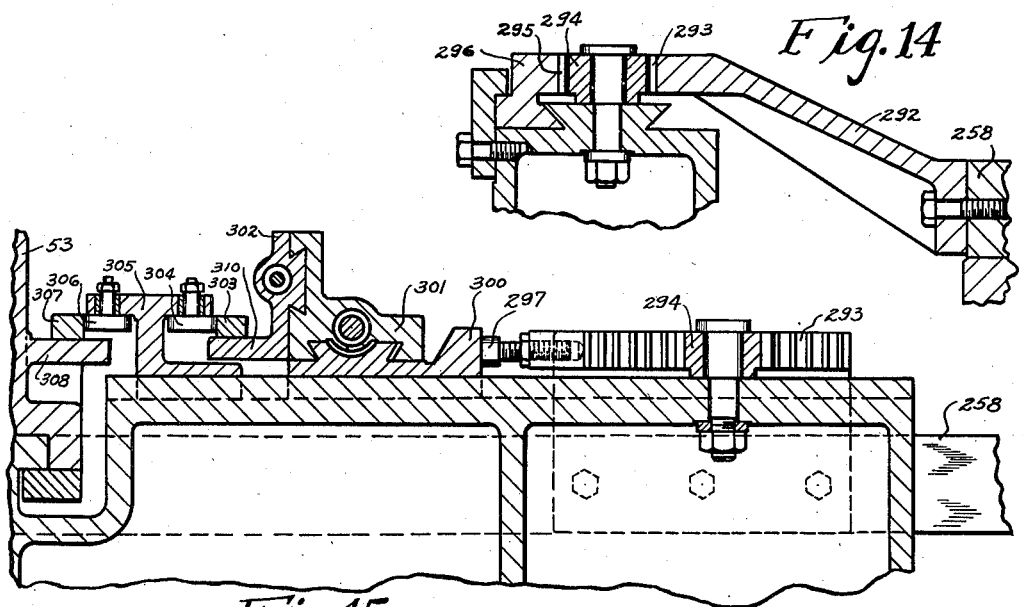
Fig. 14
Fig. 15
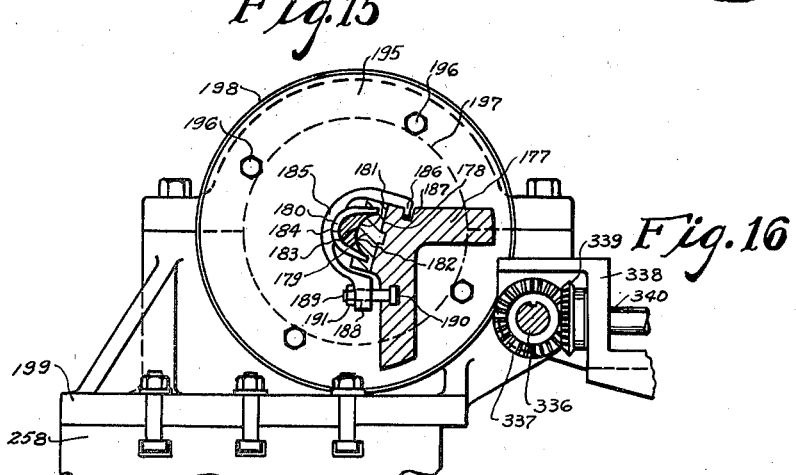
Fig. 16
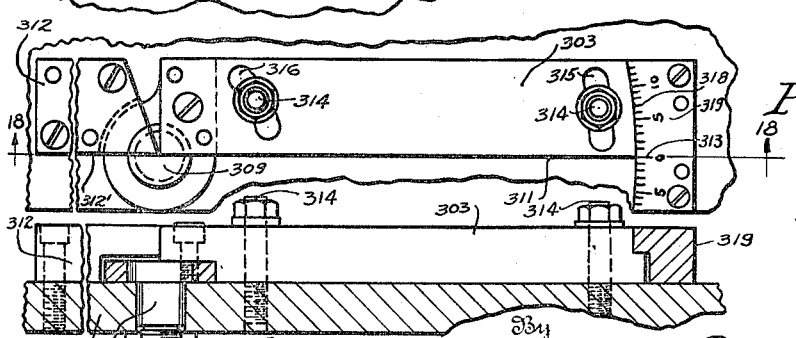
Fig. 17
Fig. 18
Inventor
ERWIN G. ROEHM
WALTER D. ARCHEA

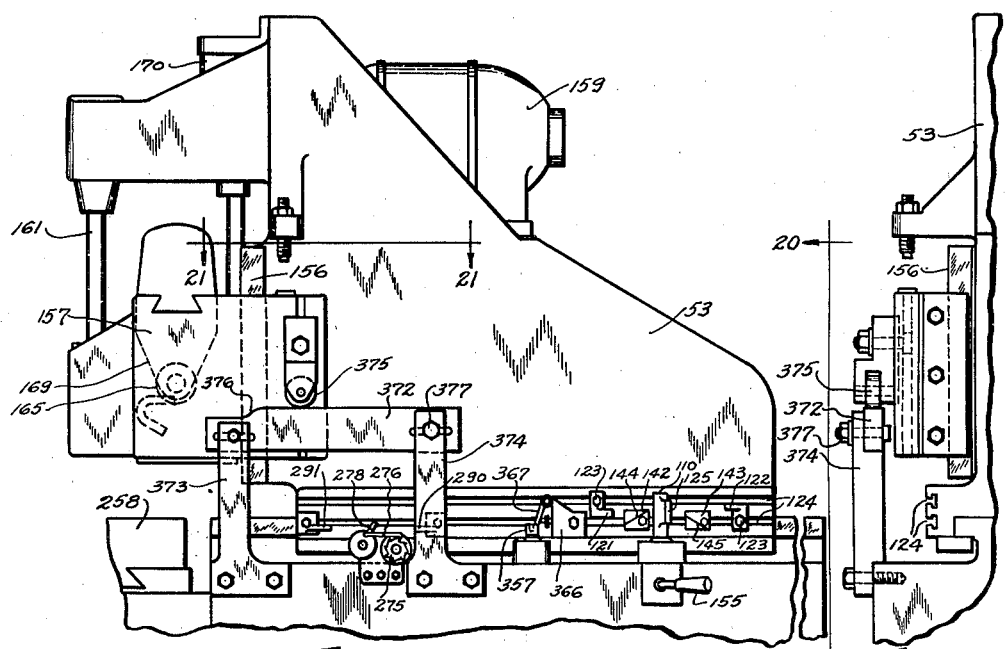
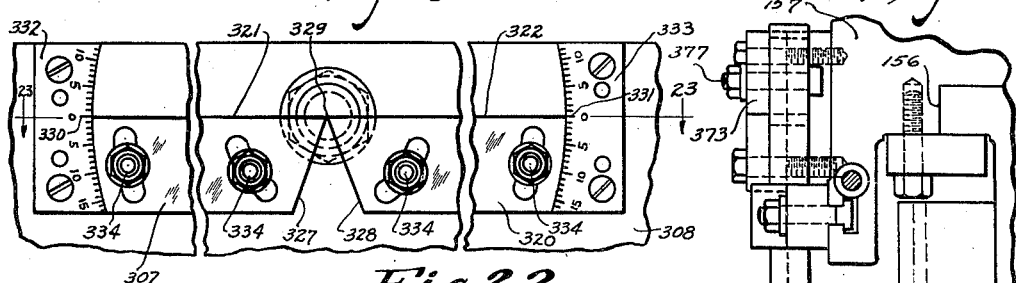
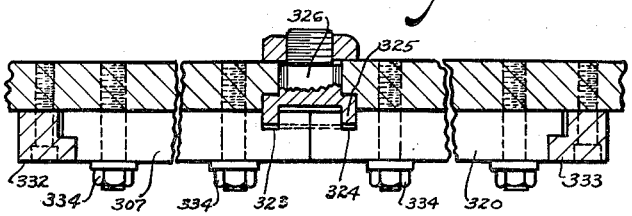
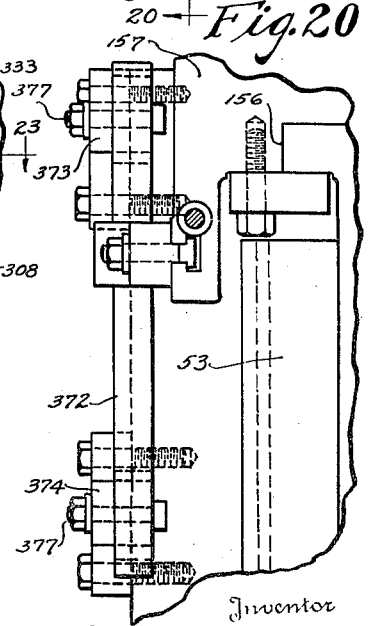

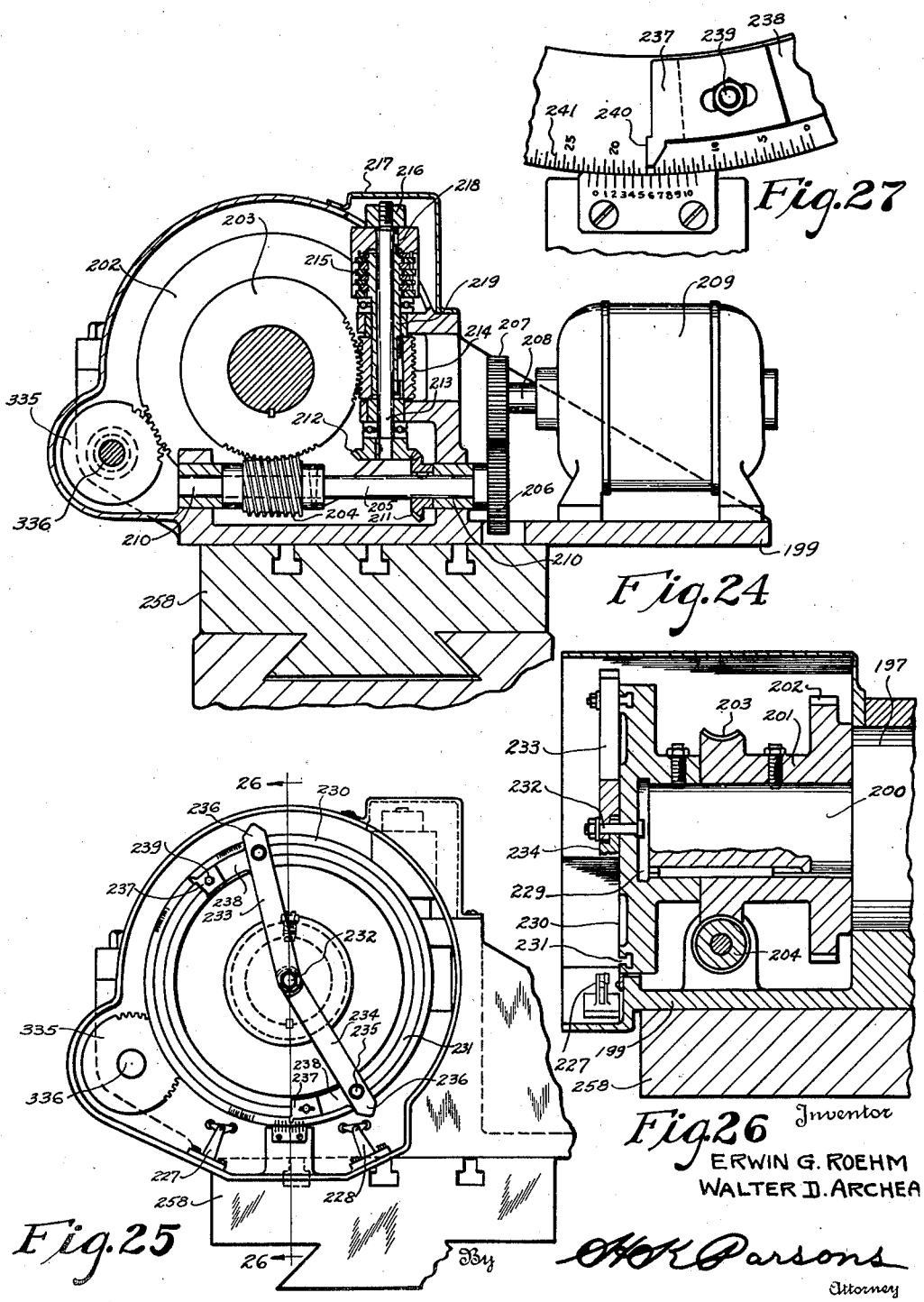

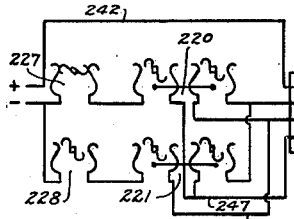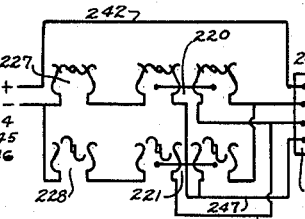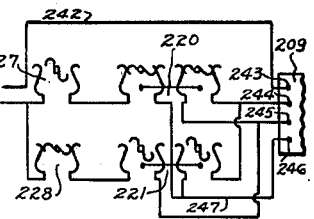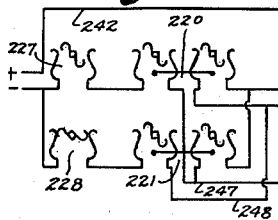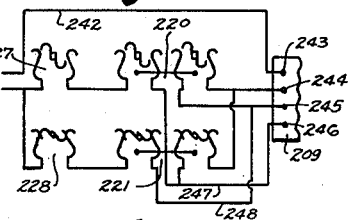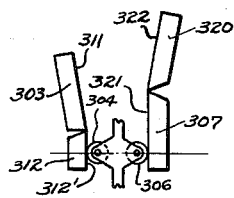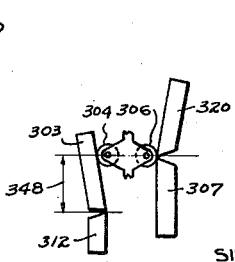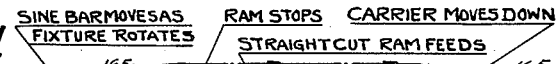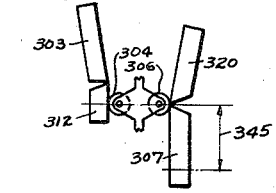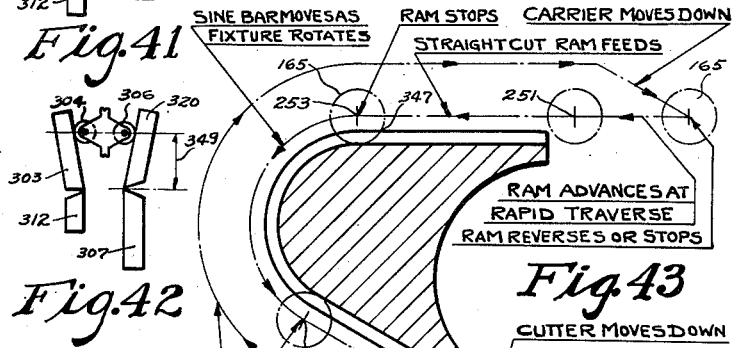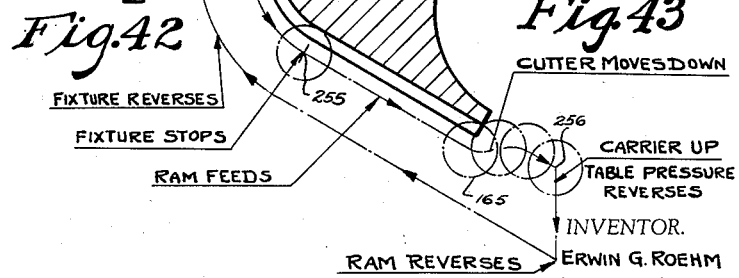

Patented May 11, 1937

2,079,717

UNITED STATES PATENT OFFICE 2,079,717

MACHINE FOR MILLING TURBINE BLADES

Erwin G. Roehm and Walter D. Archea, Norwood, Ohio, assignors to The Cincinnati Milling Machine Company, Cincinnati, Ohio, a corporation of Ohio Application January 22, 1935, Serial No. 2,908

20 Claims. (Cl. 90—15)

This invention relates to machine tool mechanisms and more particularly to an improved milling machine.

One of the objects of this invention is to provide an improved mechanism for effecting relative movement between a tool support and a work support in a path of predetermined form which is other than a straight line.

Another object of this invention is to provide an improved mechanism for effecting relative movement between a cutter and work in a predetermined path, said path having rectilinear and curvilinear portions.

A further object of this invention is to provide an improved mechanism for producing continuous movement between a cutter and work in successive rectilinear and spiral paths to form a curvilinear groove having tangent rectilinear portions at either end thereof.

A still further object of this invention is to provide an improved machine for milling curvilinear tapered portions of turbine blades.

An additional object of this invention is to provide a machine which will form a tapered curvilinear groove having tangent rectilinear portions in a single continuous automatic cycle.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims without departing from or exceeding the spirit of the invention.

Referring to the drawings in which like reference characters indicate like or similar parts:

Figure 1 is a front elevation of a machine embodying the principles of this invention.

Figure 4 is a section on the line 4—4 of Figure 3 showing the ram transmission.

Figure 5 is a partial side elevation of the machine as viewed from the right of Figure 1 showing the trip control mechanism.

Figure 6 is a detail section taken on the line 6—6 of Figure 4.

Figure 7 is a detail section as viewed on the line 7—7 of Figure 6.

Figure 7A is a section on line 7A—7A of Figure 6.

Figure 8 is a detail section as viewed on the line 8—8 of Figure 6.

Figure 8A is a section on line 8A—8A of Figure 6.

Figure 9 is a detail section as viewed on the line 9—9 of Figure 3.

Figure 10 is a horizontal section on the line 10—10 of Figure 9.

Figure 11 is a view of the selector clutch operating mechanism as viewed on the line 11—11 of Figure 9.

Figure 12 is a plan view of the parts shown in Figure 11 as viewed on the line 12—12.

Figure 14 is a section on the line 14—14 of Figure 3.

Figure 15 is a section on the line 15—15 of Figure 3.

Figure 16 is an elevation partly in section as viewed on the line 16—16 of Figure 3.

Figure 17 is an enlarged plan view of one of the sine bars.

Figure 18 is a section on the line 18—18 of Figure 17.

Figure 19 is a side elevation of the ram showing the cutter spindle drive and the spindle carrier control mechanism.

Figure 20 is an end view of the cam control for the spindle carrier as viewed on the line 20—20 of Figure 19.

Figure 21 is a plan view of the parts shown in Figure 20.

Figure 22 is a detail view of the other sine bar mechanism.

Figure 23 is a section on the line 23—23 of Figure 22.

Figure 24 is a section taken on the line 24—24 of Figure 3 showing the work holder revolving mechanism.

Figure 25 is an end elevation of the work fixture showing the control mechanism therefor.

Figure 26 is a section on the line 26—26 of Figure 25.

Figure 27 is an enlarged detail view of the vernier adjustment shown in Figure 25.

Figure 30 is a diagram of the electrical connection for controlling the work fixture and rotating motor.

Figure 31 is an electrical diagram of the control circuit for the ram transmission motor.

Figure 2:
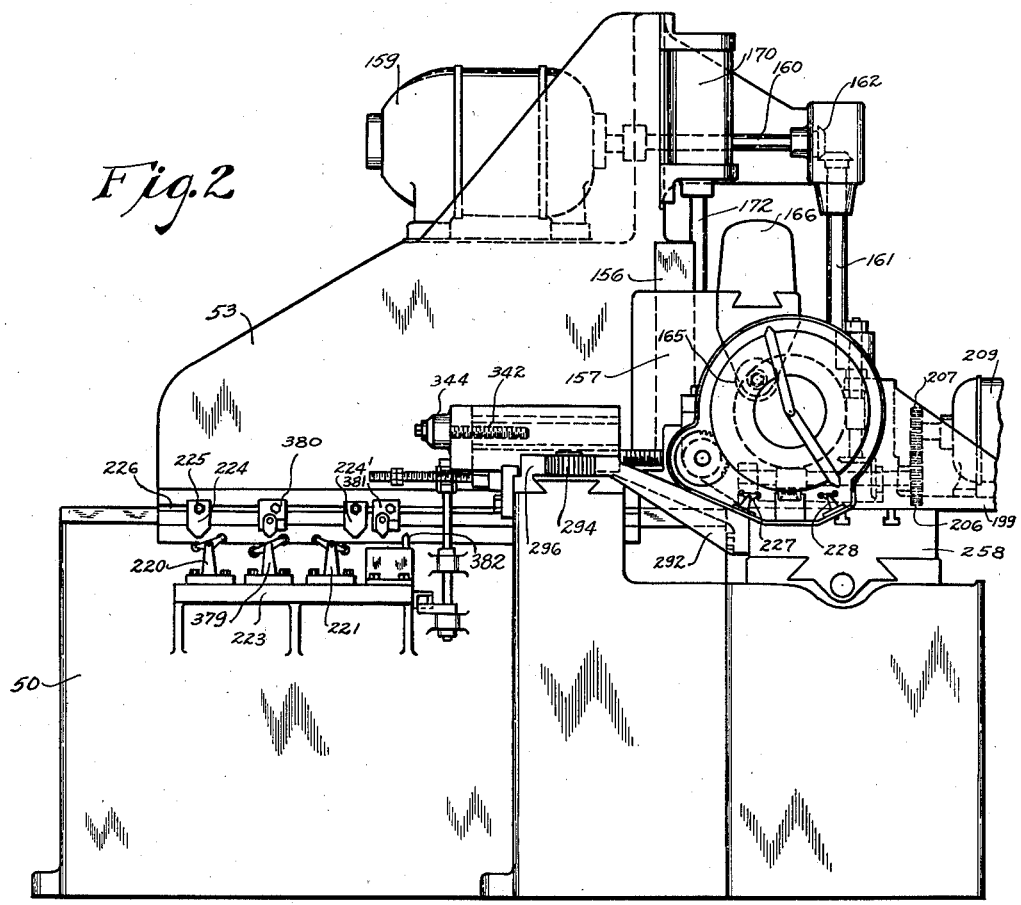
Figure 2 is a side elevation of the machine shown in Figure 1 as viewed from the left side thereof.

Figures 32 to 36 inclusive are views showing the successive positioning of the switches in Figure 30.

Figure 37 is a diagrammatic view showing the path of cutter movement as viewed in plan.

Figures 38 to 42 inclusive are views showing the successive positions of the sine bar mechanisms while shaping one side of the work groove.

Figure 43 is a diagrammatic view showing the relative positions between cutter and work as viewed in elevation without rotating the work.

One embodiment of this invention is shown in the drawings and comprises generally a work support, having a rotary work holder thereon, and a reciprocable ram carrying a cutter spindle for movement transversely of the axis of said work holder. This machine is primarily intended for forming the peculiarly shaped ports in turbine blades which have an intermediate curvilinear portion and tangent rectilinear portions, the curvilinear portion also flaring or tapering outward as viewed in plan. The machining of the groove is accomplished by effecting relative movement between the cutter and work along a rectilinear path, one of the parts being held stationary and the other moved. After the straight portion of the groove has been formed, the work is rotated about an appropriate axis relative to the cutter to form the arcuate portion tangent to the straight portion. Simultaneously, a transverse movement is effected between the work and cutter which results in a spiral movement. A second straight portion is finally formed which is tangent to the arcuate portion of the groove and this is effected by holding the work stationary at a predetermined point in its rotation and again advancing the ram until the cutter passes completely beyond the work.

Figure 3:
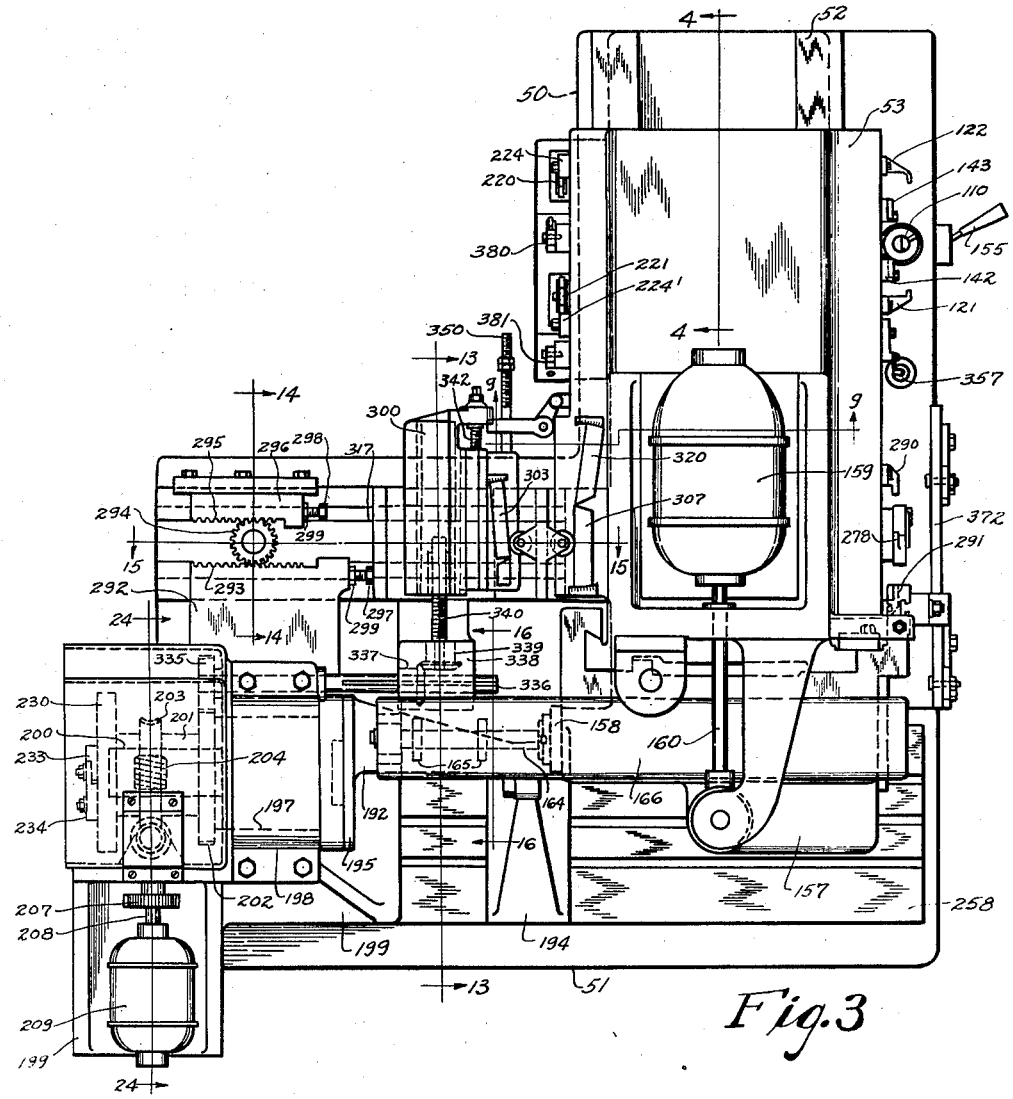
Figure 3 is a plan view of the machine shown in Figure 1.

The bed of the machine, as shown in Figure 3, is substantially L-shaped, the legs of which may be made integral; or in separate parts and then secured together. The leg 50 as viewed in Figure 3 supports the cutter carrying mechanism and parts for effecting bodily movement thereof relative to the work, while the portion 51 of the bed supports the work fixture and operating mechanism therefor.

The bed 50 has horizontal guideways 52 formed on the top thereof for guiding a reciprocable ram 53. This ram is power traversed by a transmission shown more particularly in Figure 4. As there shown, a prime mover 54 which may be an electric motor, is mounted in the base of the machine and operatively connected to a main drive shaft 55 through a gear 56 keyed to the end of the shaft, and a power transmitting band 57 circumscribing this gear and the pinion 58 secured to the end of the motor shaft. The shaft 55 has a gear 59 fixed intermediately thereof, and a second gear 60 keyed to the end thereof; the gear 59 actuating a rapid traverse transmission, and the gear 60 operating a feed train.

A shaft 61 journaled at spaced points in a fixed part of the machine has keyed thereto a feed-rapid traverse selector clutch 62. A rapid traverse gear 63 is mounted for free rotation on the shaft 61 at one side of the clutch member 62 and has teeth 64 on one face thereof adapted to engage with teeth 65 formed on the clutch member. Similarly, a final feed gear 66 is mounted for free rotation on the shaft 61 on the opposite side of the clutch member 62 and is provided with clutch teeth 67 adapted to engage with clutch teeth 68 formed on the clutch member. The gear 63 is driven from gear 59 through an intermediate gear train comprising gear 69 keyed to shaft 70, and gear 71 also keyed to shaft 70 and meshing with gear 63. The ratio of the gearing in this transmission is such that the gear 63 is rotated at a faster rate than the gear 59.

The feed gear 66 is driven from the gear 60 through a variable speed train comprising an intermediate shaft 72 having gear 73 fixed to one end in mesh with gear 66 and a pick off gear 74 detachably connected to the other end. The gear 60 is also detachable relative to the shaft 55 whereby the gears 60 and 74 may be entirely removed and a second pair of different ratio substituted therefor to effect further changes in the feed rate. To assist in effecting these changes, a removable cover plate 75 is mounted on the end of the bed permitting ready access for this purpose.

A reversing mechanism is provided in series with the feed-rapid traverse selector whereby the direction of movement of the ram may be changed. To this end a gear couplet 76 is fixed to shaft 61, one gear 77 of the couplet meshing directly with a gear 78 mounted for free rotation on a parallel shaft 79, and the other gear 80 of the couplet meshing indirectly with gear 81 mounted for free rotation on shaft 79 through an intermediate idler 82 whereby the gears 78 and 81 will rotate in opposite directions. A reverser clutch 83 is keyed to shaft 79 and has teeth 85 on one end adapted to mesh with teeth 84 formed on the face of gear 78; and teeth 86 on the opposite end adapted to mesh with teeth 87 formed on the face of gear 81. Thus by shifting the clutch member 83 in one direction or the other, the direction of rotation of shaft 79 may be determined.

The shaft 79 extends through the transversely extending rib 88 and is provided with a freely rotatable gear 89 which is adapted to be connected to the shaft through the shiftable clutch member 90 having teeth 91 thereon adapted to mesh with clutch teeth 92 formed on the face of the gear. This clutch serves to disconnect all power from the ram and therefore serves as a stopping or starting clutch. When this clutch is engaged, power is transmitted to a gear 93 which meshes directly with a gear 94 journaled in bearing 95, the gear having an internally threaded bore in the form of a nut for receiving the ram lead screw 96.

Since the work to be performed by this machine is extremely accurate, it is desirable that no looseness or lost motion exist between the lead screw and the transmission therefor. Means have therefore been provided for eliminating all back lash between the drive gear 93 and the lead screw 96, and to this end the gear 93 as well as the adjacent sleeve 97 are keyed to the shaft 98, the end of the sleeve having fixed therewith the alternate members of a friction clutch 99. The remaining members are engaged by a lug 100 carried by the gear 101, the gear being mounted for free rotation on the shaft 98. This gear meshes with gear 102 having a threaded bore 103 for receiving the lead screw 96. Gear 102 is journaled in the bearing 104 and held against axial movement. The gear 101 has a tooth differential, such as one tooth, with respect to gear 93, and the gears 94 and 102 have the same number of teeth whereby the gear 101 will attempt to drive gear 102 at a slightly faster rate than the gear 93. It will thus be seen that if the two gears 101, 93 were fixed together for simultaneous rotation, that eventually a locked condition would exist between the screw 96 and the translating nuts associated with gears 94 and 102. For this reason the friction clutch 99 is inserted between gear 93 and gear 101 to permit a certain amount of slippage but to maintain the gear 102 advanced as far as possible relative to gear 94 to create a constant separating urge between the two nuts, or a constant urge in the opposite direction causing the two to approach one another thereby insuring that all back lash is eliminated between the gear 93 and the lead screw.

Pressure on the friction clutch is maintained by a shiftable member 105 adapted to be operated in a manner set forth in U. S. Patent 1,961,125 issued June 5, 1934, and as there shown this pressure may be of the fluid actuated type. When the member 105 is not being pressure urged, a spring 106 causes the member 105 to move toward the right whereby the clutch sleeve 107 serves to operatively connect the clutch teeth 108 associated with gear 102 to clutch teeth 109 associated with gear 94 so that the two gears will rotate as a unit. This is necessary as set forth in the patent supra, because the screw 96 is not rotated and when the gear 102 is not being driven, there will be no relative movement between the screw 96 and the threaded bore 103 and the ram would simply be locked.

Transmission means have thus been provided for the movable ram comprising a feed transmission and a rapid traverse transmission actuated by a prime mover with a selector clutch for coupling either transmission to a final actuator, which drives through a reverser, in series with the feed-rapid traverse determinator, the ram lead screw. A selector clutch is inserted between the reverser and screw whereby the parts may be stopped at any point without disturbing the setting of the rate and direction determining clutches. There has also been provided back lash eliminating means to insure greater precision in the movement of the ram.

The rate and direction determining clutches 62 and 83 are controlled from a common control plunger 110 which is reciprocably and oscillatably mounted in the bed 50 as shown more particularly in Figure 6. The clutch 83 is provided with a shifter fork 111 which is pivotally mounted at an intermediate point 112 so as to provide a lever portion 113 on one side of the pivot for engaging an enlarged boss 114, Figure 8A. formed on the plunger and without any lost motion. From this it will be seen that as the plunger 110 is oscillated about its axis that the clutch member 111 will move therewith, and this makes it possible to move the clutch 83 to three different positions. To maintain the clutches in any one of these positions, a three-position detent mechanism has been provided as shown in Figure 8 comprising the collar 116 having the three indents 117, 118 and 119 adapted to be selectively engaged by the spring pressed detent 120. When the plunger is oscillated so that the detent 120 engages either of the indents 117 or 119 the clutch 83 will be in either one of its two driving positions.

Suitable dogs 121 and 122 as shown in Figure 5 are attached by bolts 123, mounted in T-slot 124, to the side of the ram for engaging a wing 125 formed on one side of the plunger. From this it will be obvious that when the clutch 83 is in either one of its operative positions causing movement of the ram in opposite directions that eventually a dog 121, or a dog 122 will engage the wing 125 and oscillate the same sufficiently to cause the detent 120 to move clutch 83 to a neutral position and stop the ram.

The plunger 110 is also reciprocable and this movement is utilized to control the position of the rate determining clutch 62. A shifter fork 126 engaging an annular groove in the clutch 62 is pivotally mounted at 127 and further provided with a lever arm 128 by which it is pivotally connected to a crank 129 keyed to the shaft 130. Pinion teeth 131 are formed on this shaft for engaging rack teeth 132 which are cut in the lower end of the plunger 110. It will thus be obvious that if the plunger is axially moved that the rack 132 will cause rotation of shaft 130 through the pinion teeth 131 which in turn will cause the crank arm 129 to oscillate the shifter fork 126. Since the rate determining clutch only has two positions, load and fire mechanism has been provided whereby the clutch will be completely shifted from one position to the other. To this end a bell crank 133 is pivotally mounted at 134 with one lever arm 135 making a lost motion connection at 136 to plunger 110 and the other lever arm 137 having a detent formed on the end thereof for engaging spaced indents 138 formed in the pivoted lever 139. A spring 140 serves to maintain the lever in engagement with the end of the arm 138 whereby upon axial movement of the plunger 110, as for instance downward, the bell crank 133 will be rotated sufficiently to ride over the peak between the indents while the clutch 62 is still engaged to provide the driving movement and then the mechanism will fire to throw the clutch to its opposite extreme position. The plunger 110 is provided with winged portions 141 on the side adjacent the ram for engagement by suitable dogs 142 and 143 shown in Figure 5, having bevel surfaces 144 and 145 respectively for reciprocating the plunger.

When the plunger is in the position corresponding to Figure 8, the lever arm 113 engages the boss 114 but when the plunger is moved axially to its other position, the forked arm 113 is moved into engagement with a second boss portion 146, Figure 7A, which fits the bifurcated portion 115 with a certain amount of lost motion. A second detent collar 147, Figure 7, carried by the plunger is now moved into engagement with the detent 120, the collar 147 only having two indents 148 and 149 formed thereon which are spaced the same as indents 117 and 119 of collar 116. This arrangement makes it possible for the trip dogs 121 and 122 to automatically reverse the direction of movement of the ram without the clutch 83 stopping in a neutral position. Attention is invited to the fact that this is only true when the table is moving at a rapid traverse rate or in other words when the plunger 110 is moved downward so that the portion 146 is moved into the bifurcation 115 and the portion 114 moved out of it.

Means have also been provided for manually positioning the plunger 110 and to this end a control lever 150 is mounted for universal movement by a ball 151 formed intermediate the length of the lever, the ball portion being secured in a fixed part of the bed. The inner end of the lever has a ball portion 152 engaging a socket 153 formed in the collar 154 integral with the plunger 110 whereby the manual lever 155 secured to the other end may be universally moved to position the plunger 110 in any one of its five positions.

From the foregoing it should now be obvious that a common control member has been provided for the rate and direction determining clutches which may be automatically controlled from suitable dogs carried by the ram or manually controlled by a suitable lever associated therewith.

As shown in Figures 1, 2 and 19 the ram has a cutter spindle supported at the forward end thereof and in order that the spindle may be adjustable, vertical guideways 156 are formed on the forward face of the ram for receiving a spindle carrier 157. A cutter spindle 158 is journaled in this carrier and adapted to be driven through conventional drive gearing mounted in the carrier. This gearing may be driven from a prime mover 159 mounted on the ram itself as shown in Figure 2, and connected to the carrier through a pair of right angle shafts 160 and 161 which may be operatively connected to one another through bevel gearing 162. Axial adjustment of the spindle may be obtained through conventional quill mechanism terminating in the adjusting knob 163 formed on the side of the carrier. A cutter arbor 164 is secured in the end of the spindle for supporting a cutting means which may comprise one or more cutters, in the present instance two cutters, such as 165, are preferably utilized. In order to reduce vibration to a minimum, an over-arm 166 is adjustably mounted in guideways 167 provided on the carrier for supporting the pendants 168 and 169 which engage the arbor at spaced points to form an outboard support for the same and thus reduce transverse movement of the arbor.

Figure 28:
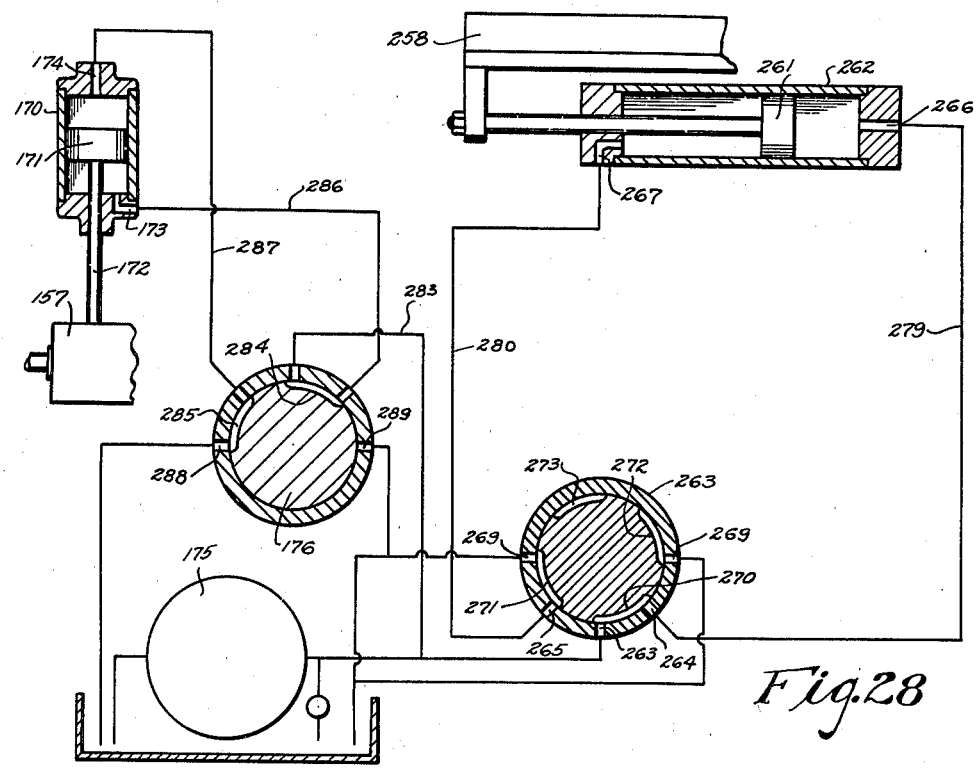
Figure 28 is a diagrammatic view of the hydraulic control circuit for the work table and spindle carrier.

The spindle carrier 157 is vertically movable during operation of the machine so that the cutters may be separated from the work during return movement of the ram to prevent interference with the work and this vertical movement is effected by an hydraulic motor in the form of a cylinder 170 having a contained piston 171 which is connected to the carrier by a piston rod 172. The opposite ends of the cylinder are provided with ports 173 and 174 through which pressure is admitted at suitable times to effect the desired movements of the carrier in timed relation to the reciprocation of the ram. Admission of fluid pressure from pump 175 as shown diagrammatically in Figure 28 to these ports is controlled by a valve 176 which is simultaneously operated in conjunction with a second valve by mechanism shown in Figure 29 and which may be more conveniently described later in connection therewith.

It may be briefly stated at this point that the ram moves the cutter spindle ahead at rapid traverse to bring the cutter to the point of engaging the work, and the trip plunger 110 is operated to reduce the rapid traverse rate to a feed rate to effect a straight cut of predetermined length in the work after which the ram is stopped and the work simultaneously started on a rotary movement. The mechanism for holding the work and rotating the same in timed relation with the other moving parts will now be described, reference being had more particularly to Figures 1, 2, 3, 16, 24, 25, 26 and 27.

The work receiving and holding member 177 is shown in cross section in Figure 16 and is of angular shape with a grooved jig receiving surface 178 formed thereon at the intersection of the legs of the angle. A jig 179 is mounted on said surface, the same being removable and replaceable by other jigs to suit the shape of the particular work piece to be milled. The work piece 180 which in the present case is a turbine blade, is somewhat crescent shaped in cross section, and since the shape of the concave surface 181 will vary with the different sizes of blades, it is necessary to provide separate jigs having convexed surfaces 182 adapted to fit the concavity of the particular blade being machined. From this figure it will be seen that the blade fits neatly into the top surface of the jig and in such relation that the center 183 of the exterior arcuate surface 184 to be formed is exactly coaxial with the center of rotation of the work supporting member 177.

Work holding strips 185 are provided for holding the work into place and these strips have a hooked end 186 engageable with a longitudinal groove 187 formed in the member 177 and an aperture 188 formed in the other end for receiving a clamping bolt 189 which is adjustably mounted in a T-slot 190 formed in one leg of the member 177. A lock nut 191 is threaded on the bolt for drawing the circumscribing strip down against the work and securing the same in rigid fashion for rotation with the member 177. A number of these strips may be used depending upon the length of the particular work piece and the number of work pieces to be secured to the work holder for simultaneous operation.

In the present construction, as shown in Figure 1, two work pieces are milled simultaneously. The legs of the angular member are tapered as shown at 192 in Figure 1 and the free end is reduced to form a bearing 193 which is supported in a bracket 194, the bracket being bolted to the table of the machine. The other end of the angular shaped member terminates in an integral circular flange 195. This flange is secured by a plurality of bolts 196 to one end of the cylindrical member 197 which is journaled in a bearing 198 formed in the bracket 199 which bracket is bolted to the work table.

The opposite end of the member 197 has a reduced cylindrical portion 200 to which is keyed the gear couplet 201, Figure 26, the gear couplet comprising a spur gear 202 and a worm gear 203. A worm 204 is journaled in the lower part of the bracket 199 at right angles to the axis of the worm wheel and in mesh therewith. This worm is fixed to a shaft 205, as shown in Figure 24, having a drive gear 206 fixed to the end thereof in mesh with gear 207 secured to the armature shaft 208 of prime mover 209. The prime mover in the present case may be an electric motor fixed to the bracket 199 so as to move back and forth with the table.

The shaft 205 is journaled in bearings 210 and has keyed thereto a bevel gear 211 which meshes with a similar bevel gear 212 keyed to the end of a vertical shaft 213. From this construction it will be seen that an independent transmission system is carried by the table for effecting rotation of the work and since it is necessary that no lost motion occur in this transmission, an additional worm wheel 214 is mounted on the shaft 213 in engagement with the worm 203. This worm is driven through a friction clutch 215 similar to the one previously mentioned in connection with the ram transmission drive, but in this case a locking member 216 is mounted at the upper end of the shaft 213 for effecting a predetermined amount of friction between the plates and the amount of this friction may be varied by removing the cover plate 217 which incloses the clutch. One end of the friction member is keyed at 218 to the shaft 213 and the output end of the friction clutch is keyed to the sleeve 219 to which is also keyed the worm gear 214. The worm gear 214 is of slightly different pitch than the worm 204 so that there is a constant tendency to drive the worm wheel 203 faster than the worm 204 so as to effect a constant separation between the two worms. Locking of the parts is prevented by providing the friction clutch which permits a certain amount of slippage between the two drives. It will thus be seen that the work is positively rotated through a mechanism which eliminates the possibility of the work jumping relative to the cutter and also due to the nature of the worm drive it is self-locking and holds the work stationary during bodily movement of the cutter.

As previously mentioned, rotation of the work must be initiated simultaneously with the termination of ram movement and this is controlled by an electrical circuit which automatically starts and stops the fixture motor 209. This electrical circuit is diagrammatically illustrated in Figure 30 and comprises a pair of double switches 220 and 221 which, as shown in Figure 2, are mounted on a bracket 223 projecting from the side of the bed 50 and adapted to be engaged by suitable trip dogs 224 and 224' respectively mounted on the side of the ram and secured thereto by bolts 225 slidably mounted in a T slot 226. A second pair of switches 227 and 228 are mounted on the fixture 199 as shown in Figure 25 and in adjacent relation to a rotatable dog wheel 229 which is also keyed to the end of shaft 200 for rotation with the work fixture.

This wheel, Figures 25 and 26, is provided with a flat face 230 in which is formed a circular T-slot 231 adjacent to its periphery. A central bolt 232 passes through this face and pivotally supports a pair of radial switch operating arms 233 and 234. These arms are rotatably adjusted about the center and are locked in position by bolts 235 mounted in the T-slot 231. Since the range of movement is in the neighborhood of 180 degrees these arms will extend somewhat diametrically opposite to one another. The end of each arm is provided with a double tapered surface 236 so that upon movement in a clockwise direction they will each engage one roller of the respective switches 227 and 228 and upon movement in the other direction they will engage the other roller of the same switches. To exactly determine the position of each arm and thereby the exact timing of the starting and stopping of motor 209, a vernier scale is provided in connection with each arm as shown more particularly in Figure 27. A pointer member 237 is adjustably secured to a laterally extending lug 238 integral with the arm, by a locking bolt 239. The end of the member 237 has an index surface 240 which is adapted to register with graduations 241 formed on the periphery of the plate 229.

The switches used may be any commercially known type of limit switch which has two positions and adapted to be trip actuated from either position to the other.

The sequence of operation of these switches and the results produced thereby will now be explained. The position of the switches shown in Figure 30 corresponds to the starting position of the machine at which time the ram 53 is in a returned position and therefore is furthest away from the table. Upon starting the machine, the ram moves forward at a rapid traverse rate and then at a feed rate and just prior to the termination of the feeding movement of the ram the dog 224' trips switch 221 to open the same and thereby resetting the switch and conditioning the circuit so that switch 220 may become effective.

Immediately after this resetting operation, another trip dog 224 trips switch 220 which occurs simultaneously with the disengagement of the stop clutch 91. The effect of this is to stop the forward movement of the ram and start rotation of the fixture. The relationship of the switches at this moment is shown in Figure 33 from which it will be seen that the current flows through line 242 to pole 243 which may be one terminus of the field coil of fixture motor 209 the other pole 244 of which is connected through one member of switch 220 to the terminus 245 of the motor armature, the other terminus 246 being connected through line 247, the other member of switch 220 and switch 227 to the other power line. Since switches 228 and 221 are open at this time, none of the motor parts will be short-circuited. This will cause rotation of the fixture motor 209 in one direction which in turn will cause counter-clockwise rotation of the work fixture as viewed in Figure 2. As soon as the work fixture rotates, it will trip switch 228, thereby resetting the same without changing the operation of the circuit.

The fixture will continue to rotate counter-clockwise until the arm 236 trips switch 227 which will open the armature circuit of the motor and stop rotation thereof. At this time through means to be described later, the cutter spindle ram will start to move forward a sufficient amount to complete the cut. At the completion of the cut, the cutter spindle will be raised and the ram returned at a rapid traverse rate. During this return movement the switch 220 will be opened and shortly thereafter switch 221 will be closed and the switches will have the relative positions shown in Figure 36. The current now flows through line 242 through the field coil, but the terminus 244 thereof is now connected through branch line 248 and one member of switch 221 to pole 246 of the motor armature, the other pole 245 thereof being connected through line 248, the other member of switch 221 and switch 228 to the other power line. This will cause rotation of the fixture motor 209 in the opposite direction and thereby cause clockwise rotation of the work fixture. As soon as this rotation starts, switch 227 will be closed; and at the end of the rotation switch 228 will be opened and the circuit will be in the same condition as that shown in Figure 30.

Thus the movement of the ram forward is utilized to initiate rotation of the fixture, but the fixture has means self-contained therewith to stop its own rotation.

This machine is designed more particularly for milling the ports of turbine blades and the shape of this port as rolled out in plan is shown in Figure 37. It will be noted that it consists of a groove having parallel side portions 249 and 250 and that at some intermediate point these side surfaces flare to gradually increase the width of the groove. Since it is impossible to provide a gradually increasing width of cutter, this groove is formed in two cuts taken successively in an automatic cycle, and the cut may assume to begin at the point 251 and progress in the direction of the arrows 252 so that at the point 253 it will be obvious that a simple rectilinear cut has been taken. At this point the work fixture and work are moved in the direction of arrow 254 during the formation of the portion between the point 253 and the point 255. This is the portion that is formed by rotation of the fixture while the cutter spindle is held stationary. At the point 255 the rotation is stopped and the ram is again fed forward and simultaneously the cutter spindle is moved downward to finish the rest of the groove.

At the point 256 the parts are reversed and returned to a starting position indicated at 257 at which time the parts are again automatically reversed; but at this point, the pressure on the work table is changed to move the table 258 in the direction of the arrow 259 so that the side of cutter 165 now engages the side 250 of the groove. The same cycle will be performed as for the other side of the groove except that the result will be at opposite hand thereto and at the termination of the formation of this side the parts will be returned to the starting position 251 and stopped.

Figure 29:
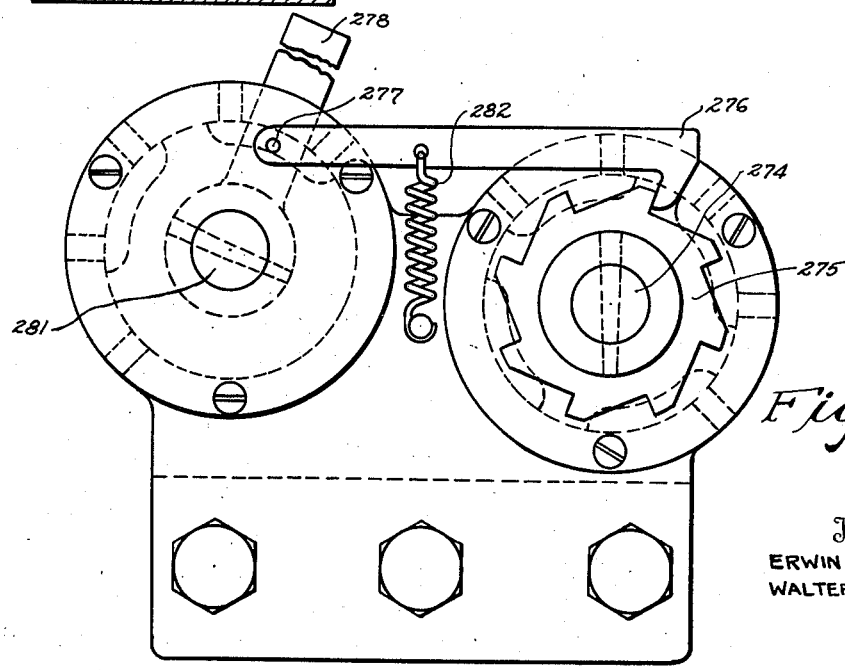
Figure 29 is a detail view of the trip mechanism for operating the control valve shown in Figure 28.

As shown in Figure 1, the table 258 has a piston rod 260 connected thereto which terminates in a piston 261 slidably mounted in the hydraulic cylinder 262 carried by the bed. There is a valve 263 diagrammatically illustrated in Figure 28 which controls the flow of fluid pressure from the pump 175 to the cylinder and this valve has an intake port 263, delivery ports 264 and 265 connected respectively to ports 266 and 267 at opposite ends of cylinder 262; and a pair of exhaust ports 268 and 269. When the valve is in the position shown in Figure 28, the pressure port 263 is connected by the groove 270 to port 266 at the right hand end of the cylinder. At this time the other port 267 of the cylinder is connected by groove 271 in the valve 270 to reservoir. The valve is also provided with another pair of grooves 272 and 273. All four of these grooves in the valve are of equal length and are equally spaced about the periphery of the valve. The valve member 270 is integrally connected to the end of shaft 274 which, as shown in Figure 29, has a ratchet wheel 275 upon the periphery of which are formed eight teeth. A ratchet pawl 276 pivoted on a pin 277 carried by the pivoted lever 278 serves to rotate the ratchet wheel and the connections are such that the valve member 270 is given one-eighth of a revolution each time the trip operable member 278 is actuated. The result of this is that unidirectional intermittent movement is imparted to the member 270 with the result that the lines 279 and 280 are alternately placed under pressure and connected to exhaust. This intermittent movement is imparted to the valve once for each reciprocation of the ram 53 and the actual turning takes place at the end of the forward stroke. The reason for the ratchet is that the member 278 is also connected to the valve member 176 shown in Figure 28, which controls the application of pressure to the cylinder 170. The pressure in this cylinder must be reversed twice for each stroke of the ram whereas the pressure in cylinder 262 is reversed only once for each stroke of the table. Therefore by means of the ratchet, the valve 176 may be moved back and forth between its two positions and the other valve may be intermittently rotated unidirectionally. As shown in Figure 29, the valve 176 is integral with a shaft 281 to which the trip arm 278 is secured. A spring 282 serves to maintain the pawl 276 in engagement with the ratchet teeth.

Pressure is supplied to the valve 176 from pump 175 through line 283 and this line is alternately connected by grooves 284 and 285 to lines 286 and 287 to cause upward and downward movement of the spindle carrier 257. The valve also has a pair of return ports 288 and 289 to which the lines 286 and 287 are alternately connected by the grooves in such a manner that one line is always connected to pressure and the other line is always connected to exhaust.

The trip arm 278 is actuated by a pair of trip dogs 290 and 291 carried by the side of the ram 53 as more particularly shown in Figure 5.

It will be noted from Figure 37 that the longitudinal position of the table 58 determines the relative position of the cutter with respect to the work and also that the amount of movement of table 258 when the pressure is reversed thereon will determine the total width of the groove. It is therefore necessary to provide stop means for limiting the movement of the table in each direction and that this stop means must be variable in order to permit the necessary movement to form the flares in the groove. This mechanism comprises an arm 292 which is secured to the side of the table 258 as more particularly shown in Figures 3 and 14. The end of this arm has rack teeth 293 cut therein which intermesh with a pinion 294. The pinion in turn meshes with rack teeth 295 formed in a slidable member 296 mounted on the side of the pinion opposite to the arm 293. From Figure 3 it will be noticed that when the table 258 moves toward the right that the arm 292 will move in the same direction, and that the slide 296 will retract toward the left, whereas upon movement of the table 258 to the left the arm 292 will retract and the slide 296 will advance toward the right.

A pair of stop bolts 297 and 298 are threaded in the arm 292 and the slide 296 respectively and lock nuts 299 are provided for securing them in adjusted position. From this it will be seen that regardless of which direction the table 258 is moved, one or the other of the stop bolts 297, 298 will be moved toward the right in Figure 3 or toward the left as viewed in Figure 15 and engage a slide 300. This slide carries a first sub-slide 301 which in turn carries a second sub-slide 302. The slide 302 has mounted thereon a sine bar 303 which contacts a roller 304 carried by an independent slide 305 which is movable back and forth in the same direction as slide 300. The slide 305 carries another roller 306 which contacts a sine bar 307 carried on a flange 308 projecting from the side of rail 53 and therefore movable therewith. From this it will be seen that the hydraulic pressure acting on the table will exert pressure through the members 300, 301, 302, the sine bar 303, the rollers 304 and 306, and the sine bar 307. From this it will be obvious that the final opposer to movement of table 258 by the fluid pressure is the sine bar 307 and this will be true regardless of the direction of the pressure on the table. By adjusting the stop bolts 297 and 298 it will be obvious that the width of the groove may be varied and also its position longitudinally of the work piece.

The sine bars serve primarily to control the movement of table 258 to form the curved sides of the groove. The sine bar 303 is more particularly shown in Figures 17 and 18, from which it will be seen that it is pivotally mounted at one end on pin 309 secured in the flange 310 of slide 302. In Figure 17 the surface 311 is the one that contacts the roller 304. It will be noted that the surface 311 lies in an axis passing through the center of pin 309 and the zero graduation 313. There is also a fixed sine bar 312 having a guide surface 312' in alignment with this axis. This means that when the sine bar is set in this position and secured by clamp bolts 314, which pass through elongated slots 315 and 316 in the sine bar, that the edge 311 is perpendicular to the guideway 317 in which slide 300 moves and that the slides 301 and 302 which are also mounted for movement in paths at right angles to the guideway 317 may be moved without disturbing the position of table 258. As a matter of fact, this sine bar is adjusted at an angle as shown in Figure 3 of the drawings. Graduation marks indicated generally by the reference numeral 318 are provided on a fixed plate 319 for determining this angle.

The other sine bar mechanism is shown more particularly in Figures 22 and 23 and comprises a first adjustable sine bar 307 and a second one 320. The faces 321 and 322 of the bars 307 and 320 respectively are the active faces which engage the roller 306. From Figure 23 it will be noted that the under side of these bars have circular grooves 323 and 324 formed therein which cooperate with the annular flange 325 formed on the fixed pivot pin 326. The abutting ends 327 and 328 of these bars are cut away to permit angular adjustment, while still maintaining contact between them at the point 329. When the bars are in the position shown in Figure 22, the faces 321 and 322 lie in a plane defined by the center 329 and the zero points 330 and 331 of the graduated scales 332 and 333 mounted respectively at the extreme ends of the bars. Clamping bolts 334 are provided for securing the sine bars in their various angular positions. The actual position utilized in the present instance for determining the form of the groove, is shown in Figure 3 in which the sine bar 320 is parallel to the direction of movement of ram 53 and the sine bar 307 adjusted at an angle.

Figure 13:
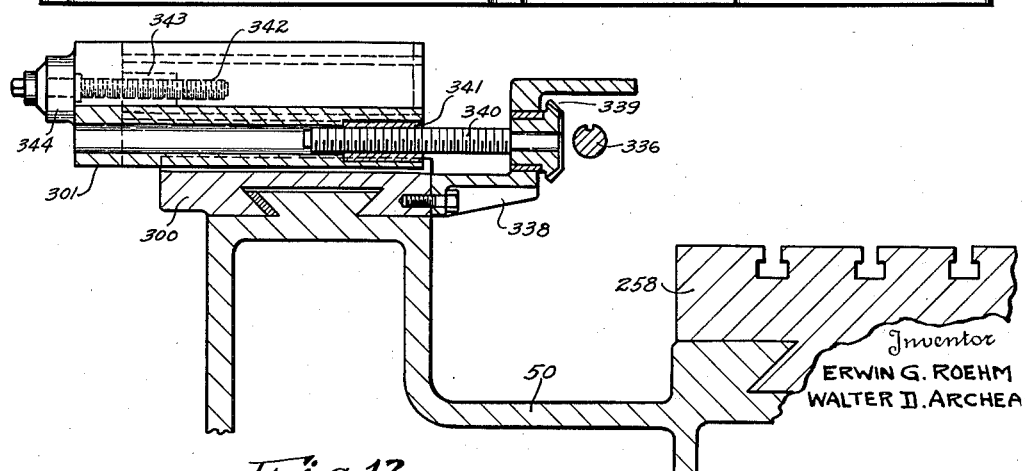
Figure 13 is a sectional view on the line 13—13 of Figure 3 showing the sine bar actuating mechanism.

The sine bars 307 and 320 are mounted for movement with the ram 53 whereas the sine bar 303 is supported for movement whenever the work fixture is rotated. The mechanism for this purpose is shown more particularly in Figures 3, 13 and 24. As shown in Figure 24 the gear 202 which is keyed to the work spindle driving member 200 intermeshes with a spur gear 335 which is keyed to the spline shaft 336. This shaft is fixed for longitudinal movement with the table 258 and has a spline connection with bevel gear 337 carried by a bracket 338 secured to and projecting from the side of the slide 300. Also mounted in this bracket is another bevel gear 339 fixed to the end of screw 340. This screw is threaded into a nut 341 fixed with the cross slide 301. Therefore as the work fixture is rotated, the gear 202 will drive through gear 335, shaft 336, bevel gears 337, 339, screw 340 and nut 341, the cross slide 301. The slide 302 which actually carries the sine bar 303 is adjustably mounted in the slide 301 which adjustment is provided for determining the longitudinal position of the sine bar. This adjustment is effected by a screw 342 which is threaded in a nut 343 carried by slide 302, the screw being fixed in a projection 344 integral with slide 301.

The relative position of the sine bars during operation of the machine is more particularly shown in Figures 38, 39, 40, 41 and 42.

In Figure 38 the sine bars are shown in a starting position which would correspond with the starting position indicated by the point 251 in Figure 37. During the first relative movement between the cutter and work represented by advance of the ram 53 to position the cutter at the point 253 in Figure 37, the sine bars 307 and 320 will be advanced an amount indicated by the length of the arrow 345 shown in Figure 39. Since during this movement the guide surface 321 of sine bar 307 is parallel to the direction of ram movement, no relative lateral movement will take place between the work and cutter.

At the point 253 the ram stops and work rotation begins. This means that the sine bars 307 and 320 will now remain stationary but sine bars 312 and 303 will move. This movement may be divided into two parts, the first movement being represented by the length of the arrow 346 in Figure 40 during which time the face 312' of sine bar 312 is the controlling element, no lateral movement will take place between the work and cutter. This short straight movement is necessary to permit the cutter represented by the circle 165 in Figure 43 to advance a sufficient amount that the heel 347 of the cutter advances to the vertical plane passing through the point 253 because it is really the heel of the cutter that determines the final contour of the groove. After this has been accomplished, the sine bar 303 advances an amount indicated by the length of the arrow 348 in Figure 41 to effect a continuous lateral movement between the work and cutter during the rotation of the work.

At completion of rotary movement of the work, the parts will be in position corresponding to the point 255 in Figure 37 at which time the sine bars 312 and 303 will halt and the sine bars 307 and 320 will begin to advance. The amount of this advance is represented by the arrow 349 in Figure 42 which will cause a further lateral movement between the cutter and work out to the point 256 shown in Figures 37 and 43 at which reversal of the parts will take place and all the different elements will return to a starting position.

The advance positions of the sine bars shown in Figures 38 to 42 inclusive will be the same regardless of which side of the groove is being cut due to the arrangement of the mechanism previously described.

Since the sine bars are adjustable it is apparent that they may be all arranged in parallel planes whereby simply an annular groove lying in the plane perpendicular to the axis of the work piece may be formed; or they may be arranged at different angles to produce spiral cuts which intersect and therefore of opposite hand. It will be evident to those skilled in the art that only one cut may be taken with the cutter and various shapes of grooves obtained by adjusting the sine bars, or two cuts may be taken as described whereby other combinations of shapes of grooves may be obtained; but since a common bar control mechanism is provided, both sides of the groove will be the same but of opposite hand.

It has been previously suggested that at the point 255 Figure 37, that work rotation stopped and movement of ram 53 began. The manner of automatically stopping the work rotation has already been described, and the manner in which ram movement is automatically instituted again will now be described. The slide 302 which carries the sine bars 303 and 312 has a threaded member 350 projecting from the rear end thereof as more particularly shown in Figure 10, upon which is mounted a pair of adjustable lock nuts which are adapted to engage a bifurcated trip lever 352 which impresses the member 350, as more particularly shown in Figure 9. The member 352 is fixed to the upper end of a rotatable rod 353 which carries a crank 354 on the lower end thereof and connected by a link 355 and crank 356 to a rotatable shaft 357 which is more particularly shown in Figures 11 and 12. The link 355 has connected at an intermediate point 358 one arm 359 of a bell crank 360 the other arm 361 of which constitutes a shifter fork for the stop clutch 90 more particularly shown in Figure 4. Integral with the bell crank is a detent plate 362 having a pair of indents 363 and 364 for engagement by the spring pressed detent 364 which serves to hold the clutch in either one of its two positions.

The clutch is thrown out by a dog 366 carried on the side of the ram 53 as more particularly shown in Figure 5, and comprises pivoted member 367 which is normally held in the position shown in Figure 11 by a spring pressed plunger 368. As the ram advances the tip of member 367 engages the face 369 of lug 370 projecting laterally from the top of shaft 357 which causes compression of spring 371 and finally rotation of shaft 357. This rotation by the dog will continue until the detent 365 shown in Figure 10 comes into operation to complete the firing movement which firing movement is sufficient to move the lug 370 out of the path of member 357 so that the spring pressed plunger 368 may move the pivoted member 367 a sufficient amount to permit clockwise rotation of shaft 357 as viewed in Figure 12 to a clutch engaging position without interference from member 367. In other words, the dog 365 performs the function of throwing out the stop clutch and so positioning the trip parts on one side of the table that the clutch may be re-engaged by other means without interference therefrom.

This other means comprises the lock nuts 351 on member 350, which engage the bifurcated trip arm 352 after a predetermined amount of advance of the the sine bar carrying slide 302.

It will now be seen that the ram 53 carries a control dog by which its own movement may be stopped, and that external means controlled by a predetermined amount of work movement reengages the stop clutch to effect continuance of ram advancement.

As the cutter passes out of the end of the groove, the work is still moving laterally with respect to the cutter and in order to prevent the formation of two large a radius in the corner of the groove the cutter spindle slide is moved down beginning at the point when the axis of the cutter lies in a vertical plane, passing through the end of the groove. In other words, if the cutter is moved down after this point the depth of the groove is not deepened. This downward movement is controlled by a cam plate 372 supported at opposite ends by fixed brackets 373 and 374 carried by the bed of the machine. The cutter spindle slide 157 has a vertical adjustable roller 375, Figure 5, mounted thereon for engagement with the upper surface of the cam bar. This upper surface is parallel throughout most of its length whereby the cutter spindle axis is maintained in a common plane throughout most of the cutting operation, but has a slightly curved portion 376 which permits the axis of the cutter to descend a predetermined amount as the cutter passes out of the end of the groove. The amount of this descent may of course be varied in accordance with the depth of groove being cut by substituting other plates for the one shown. These plates may be detachably secured to the brackets 373 and 374 by the clamp bolts 377.

Having described the operation of the individual mechanisms, the sequence of operation necessary to cut one side of the work groove shown will now be explained. Assuming the operator has clamped a work piece in the fixture by the means shown in Fig. 16, and that the ram 53 is in its extreme returned position, the operator depresses a push button 378 shown in Figure 31 which closes the circuit to motor 54 which drives the transmission shown in Figure 4. This push button is connected in parallel with switch 379 which is open when the machine is started. It is necessary for the operator to hold this push button depressed a sufficient amount of time for the ram 53 to return a small additional distance, to cause the dog 380, shown in Figure 2, to trip the switch 379 to a closed position after which the ram reverses and starts ahead. This rapid traverse movement continues until the dog 142, Figure 5, raises the plunger 110 to a feed position. The cutter then cuts the portion of the groove 249, Figure 37, during which time the sine bars are advancing to the position shown in Figure 39, and the dog 224' has opened switch 221. At the point 253, the dog 366 has operated the trip plunger 357 to throw out the stop clutch 90 and simultaneously the dog 224 has tripped switch 220 to start rotation of the work fixture, the switches now being in the position shown in Figure 33. As the work fixture rotates, the sine bars advance to the position shown in Figure 41 to effect the desired relative lateral movement between the work and cutter. At the termination of this advance, the member 350 on the sine bar slide shown in Figure 10 operates the trip lever 352, to re-engage the stop clutch 90. At the same time, the arm 236 on the fixture will trip switch 227 to open the circuit, Figure 34, to fixture motor 209 and stop rotation of the work.

Re-engagement of the stop clutch will cause a continuance of cutter advance at a feed rate. During this advance the sine bars will move to the position shown in Figure 42 and during the final part of this movement the cutter spindle slide 157 will move downward by hydraulic pressure under control of the cam surface 376 of cam bar 372 as the cutter passes out of the work. Also at this time a latch dog 381 passes over a trip plunger 382 without depressing the same.

One side of the groove having now been finished, the dog 122 will throw plunger 110 and dog 290 will rotate trip lever 278. This will cause elevation of cutter slide 157, shifting of table 258 to the left as viewed in Figure 1, and rapid return movement of ram 53. As this return movement starts, the latch dog 381 will depress plunger 382 and ratchet rotatable switch member 383 to a circuit closing position. The plunger 382 has a spring pressed pawl 384 which engages teeth of the ratchet wheel 385 upon downward movement of the pawl and a spring 386 serves to return the plunger after the dog 381 passes off of it.

During return movement of the ram, switches 221 are thrown to initiate return rotation of the work while a switch on the table stops the rotation all in a manner as previously described.

At completion of the first return movement of the ram, the switch 379 is open and closed by dog 380 but since switch 383 is closed, no effect is produced on the motor 54.

The machine then passes through another cycle to cut the other side of the groove and on its next return movement ratchets switch 383 open whereby upon opening of switch 379 by dog 380 the machine stops.

There has thus been provided an improved automatic machine for milling the complicated surface constituting the port in a turbine blade, the formation of which may be divided into steps comprising a rectilinear cut, a spiral cut, and a second rectilinear cut at an angle to the first one to form one side of the port groove and a repetition of these to form the other side of the groove but to the opposite hand, all of which is accomplished with a single cutter of sufficient width that no island of unremoved material is left in the port groove so that a subsequent finishing operation is unnecessary.

What is claimed is:

1. In a machine tool having a work support and a tool support, the combination of means for rotatably supporting a work piece on the work support for movement relative thereto, power operable means for effecting relative movement between the tool support and the work piece along a rectilinear path and a curvilinear path in continuous succession whereby an irregular shaped surface may be formed on the work, and means to effect a relative translation between the tool and work during relative movement along said curvilinear path.

2. In a machine tool having a cutter spindle and a work support, the combination of means to support the cutter spindle for movement along a first rectilinear path relative to the work support, additional means for supporting the cutter spindle for rectilinear movement along a second path, power operable means for causing movement along one of said paths severally, and subsequently along both paths simultaneously and in continuous succession with the first movement, and cam means for controlling the rate of one of said rectilinear movements.

3. In a machine tool having a cutter spindle and a work support, the combination of means to support the cutter spindle for movement along a first rectilinear path relative to the work support, additional means for supporting the cutter spindle for rectilinear movement along a second path, power operable means for causing movement along one of said paths severally, and subsequently along both paths simultaneously and in continuous succession with the first movement, and additional power operable means for effecting a relative bodily movement in a direction normal to said rectilinear movements and simultaneously therewith.

4. In a machine tool having a work support and a reciprocable ram, the combination of a cutter spindle carried by the ram, power operable means to feed the ram relative to the work support, power operable means carried by the ram for moving the cutter spindle relative to and during feeding movement of the ram including a cam, and hydraulic means for causing movement of the cutter spindle at a rate determined by said cam.

5. A milling machine having a reciprocable ram, a cutter spindle carried thereby, a rotatable work holder, power operable means for moving the ram and thereby the spindle relative to said work holder, means trip operable by the ram for initiating rotation of the work holder after a predetermined movement of the ram, and means trip operable by the work holder for stopping rotation thereof.

6. A milling machine for forming irregular-shaped surfaces on a work piece including a tool spindle, a movable slide for supporting said tool spindle, a rotatable work holder, power operable means for moving the slide while said work holder is stationary, different means simultaneously trip operable by the slide to stop its own movement and initiate rotation of the work holder, and means actuable by the work holder after predetermined movement thereof to stop said rotation and initiate a subsequent movement of the ram in the same direction as said first movement.

7. A milling machine having a longitudinal work supporting slide, a cutter carrying slide supported for movement transversely of the first slide, means to rotatably support a work piece on the first slide, a power operable transmission including a stop clutch for effecting movement of the second slide, trip means operable by the cutter slide for shifting said clutch to interrupt movement of the cutter slide, and power operable means for rotating the work holder during said interruption.

8. A milling machine having a reciprocable cutter support, a cutter carried thereby, means to support a work piece for rotation on its own axis and for bodily movement parallel to its axis, power operable means for advancing the cutter support and thereby the cutter along a rectilinear path to produce a first portion of an irregular surface to be formed on the work, means to effect simultaneous movement of the work about and longitudinally of its axis to produce a second portion of said surface, and means to effect simultaneously an additional advance of the cutter slide and movement of the work parallel to its axis to produce a third or final portion of said surface.

9. In a milling machine having a cutter slide and a rotatable and reciprocable work support, the combination of means for effecting a first relative movement between the slide and support along a rectilinear cutting path, subsequently operable means for effecting a second relative movement between the parts along a spiral cutting path, and means for effecting a third relative movement between the parts along a path different from said first named two paths.

10. In a milling machine having a reciprocable cutter supporting slide and a rotatable and reciprocable work support, the combination of transmission and control mechanism for effecting relative movement between the supports including a first transmission means for reciprocating the cutter slide including a feed train and a rapid traverse train, means to couple the rapid traverse train for movement of said slide to advance the cutter to the work, means trip operable by said slide to couple the feed train for movement thereof, a second transmission means for causing movement of the work support including an electrical prime mover and switch control means therefor, and means simultaneously trip operable by the cutter slide for disconnecting said feed train and closing said switch means respectively whereby the cutter slide will stop and the work support will move thereby changing the direction of the cutting path.

11. In a milling machine having a support, a work slide reciprocably mounted upon the support, a ram mounted on the support for movement transversely of the work slide, a spindle carrier adjustably mounted on the ram, a rotatable work fixture mounted on the work slide, transmission and control means for effecting relative movement between the parts including a first power operable train for moving the ram transversely of the work fixture, a second power operable train for rotating the work fixture, control means operable by the ram for stopping its own movement and initiating movement of the work fixture, means trip operable by the work fixture for stopping its own movement and re-coupling the ram with its operating train to continue movement of the cutter spindle transversely of the work support, and fluid operable means for elevating the spindle carrier at the end of the ram movement.

12. A milling machine having a longitudinally movable work table, a cutter spindle, a slide for supporting the cutter spindle with its axis parallel to the axis of table movement, power operable means for effecting movement of the cutter spindle laterally of its axis in two directions, means to support a work piece on the table for rotation about an axis parallel to the cutter axis, and control means for interrupting movement of the cutter spindle during rotation of the work piece.

13. In a milling machine the combination of a cutter support having a rotatable cutter journaled thereon, a longitudinally movable work support, power operable means for advancing and retracting the cutter support with respect to the work support, a sine bar carried by the cutter support, a follower engaging the sine bar, and motion transmitting means connecting the follower for movement of the work support during advance of the cutter support.

14. A milling machine having a bed, a cutter support reciprocably mounted upon the bed and having a cutter rotatably journaled therein, a work support movable at right angles to the axis of movement of the cutter support, power operable means for advancing and retracting the cutter support with respect to the work support, a sine bar carried by one of said supports, a follower engaging the sine bar, fluid operable means for maintaining following engagement between the follower and sine bar, and motion transmitting means connecting the follower for movement of the work support during advancing movement of the cutter support.

15. A milling machine having a bed, a cutter support reciprocably mounted upon the bed and having a cutter rotatably journaled therein, a work support movable at right angles to the axis of movement of the cutter support, power operable means for advancing and retracting the cutter support with respect to the work support, a sine bar carried by one of said supports, a follower engaging the sine bar, fluid operable means for maintaining following engagement between the follower and sine bar, motion transmitting means connecting the follower for movement of the work support during advancing movement of the cutter support, said motion transmitting means including a pair of plungers oppositely movable for engagement with said follower, one of said plungers being directly connected for movement with the table and the other connected for movement in a direction opposite to the direction of table movement whereby regardless of the direction of fluid pressure the same sine bar may be utilized to control the movement of the table in timed relation with the advance of the cutter support.

16. A milling machine for forming a contoured groove in a work piece comprising a cutter support, a movable work support, means to advance and retract the cutter support normal to the axis of movement of the work support, a sine bar carried by the cutter support, a follower engaging the sine bar, motion transmitting means connecting the follower for movement with the table, fluid operable means for shifting the table to maintain engagement between the follower and the sine bar for controlling the contour of one side of said groove, means for changing the direction of said pressure, mechanical reversing means for causing opposite movement of the work support to still maintain pressure between the sine bar and follower during a second advance of the cutter support to form the contour of the other side of the groove but to the opposite hand of the first side.

17. A milling machine having a bed, a cutter support reciprocably mounted upon the bed, a rotatable work holder supported by the bed, means for advancing and retracting the cutter support in a direction normal to the axis of rotation of said work holder, a sine bar mechanism, power operable means for rotating said work holder, motion transmitting connections for effecting longitudinal movement of the sine bar simultaneously with rotation of the work holder, a follower, means connecting the follower to the work holder for bodily changing the position thereof with respect to the advancing cutter and during rotation of the work.

18. In a milling machine having a longitudinally movable work support and a cutter support reciprocable in a direction normal to the direction of movement of the work support, the combination of transmission and control means for effecting a predetermined number of reciprocations of the cutter support, means for moving the work support to a first position during the first reciprocation of the cutter support and to a second position during the second reciprocation of the cutter support, said transmission and control means including an electrical prime mover, a power circuit therefor including a first switch for temporarily closing the circuit to initiate movement of the cutter support, a second switch operable upon movement of the cutter support for automatically closing said circuit, means trip operable by the cutter support during each return movement thereof to open and close said second switch, an additional switch, means operable by the cutter support for alternately closing and opening said second switch during the successive return movements of the cutter support, said second switch being connected to render the first switch ineffective when the second switch is closed whereby the cutter support will execute two reciprocations before being automatically stopped.

19. In a milling machine having a cutter support and a work support, the combination of means for rotating said cutter about its axis, means for supporting a work piece on the work support for rotation about an axis parallel to said cutter axis, a power operable train for moving the cutter laterally of its axis into engagement with the work to produce a plane surface thereon, motion interrupting means automatically operable by the moving cutter support for disconnecting said power train, additional means operable by the moving cutter support for initiating rotation of said work including an electrical prime mover, and means operable by said prime mover for causing movement of the work support parallel to the cutter axis.

20. In a milling machine having a cutter spindle rotatable about a horizontal axis, a work support, a cutter spindle support, a power train for moving said cutter spindle support in a working plane containing the axis of said spindle, fluid operable means for moving the cutter spindle into and out of said plane, motion interrupting means effective on said train for interrupting movement of the cutter during movement in the work plane, a prime mover and power train operated thereby for rotating the work support during interruption in the movement of the cutter, and means operable by said last-named train for causing a bodily movement of the work support in a direction parallel to the working plane of the cutter.

ERWIN G. ROEHM.
WALTER D. ARCHEA.